United States Patent [19]
Heisson

[11] Patent Number: 4,787,556
[45] Date of Patent: Nov. 29, 1988

[54] GRIP PLATE

[76] Inventor: Gary J. Heisson, 86 Rockland Rd., Auburn, Mass. 01501

[21] Appl. No.: 37,340

[22] Filed: Apr. 13, 1987

[51] Int. Cl.⁴ .............................................. E01B 63/00
[52] U.S. Cl. ........................................ 238/14; 152/208
[58] Field of Search ............... 180/16; 152/208, 214, 152/215, 216, 223, 225 R; 238/14

[56] References Cited

U.S. PATENT DOCUMENTS 3,025,002  3/1962  Kunz ..................................... 238/14
3,630,440  12/1971 Sams ..................................... 152/216
3,878,988  4/1975  Blais .................................... 152/208

Primary Examiner—John J. Love
Assistant Examiner—Donn McGiehan
Attorney, Agent, or Firm—Charles R. Fay

[57] ABSTRACT

A grip plate to aid in freeing a vehicle from being stuck on a slippery surface, comprising a flat rectangular iron plate with a lip at one end and an upstanding lug at the other end, with an upward angular portion of the plate between the lug and the main body portion of the plate.

7 Claims, 2 Drawing Sheets

GRIP PLATE

FIELD OF THE INVENTION

Device to aid in freeing any vehicle that has become stuck on a slippery surface, e.g. ice, snow, mud, sand, etc.

BACKGROUND OF THE INVENTION

Traction enhancing devices of many kinds have been presented in the past, one such being disclosed in U.S. Pat. No. 4,300,722, Nov. 17, 1981. This patent shows a relatively light weight pressed metal planar frame having upturned and downwardly extending lips or projections, to be manually thrust as well and as tightly as possible under a tire, the vehicle to be driven onto the frame. Other devices resemble woven and other linkage type mats, etc. None of the prior art devices are wholly operative under all the varied conditions encountered, and the present grip plate has been found to be fully Operative under a great variety of situations of the kind contemplated through the use of a very simple device and mode of operation.

SUMMARY OF THE INVENTION

A relatively heavy metal flat plate has a reduced forward end with a single upstanding central lug, not a wide lip, for engaging into the tire tread. At the opposite end of the plate, which is somewhat elongated, or rectangular, there s a cross lip extending downwardly, in the opposite direction from that of the lug. If desired, the upper, lower, or both sides of the plate may be provided with anti-skid means, but this is optional.

The lug is triangular and is the tip of a triangular end portion of the plate that forms the reduced forward end referred to. Intermediate the upturned lug and the base of the triangular reduced end portion of the plate, there is a bend therein, so that the entire lug is significantly higher than the plane of the plate, being the finial of still another triangular portion of the plate that extends from the main triangular end portion to the lug. This structure makes the lug slightly reversed relative to the plane of the plate as it is at a right angle to the bent up portion of the reduced end of the plate. The area or line between the plate and the bent up portion forms a fulcrum in the use of the grip plate. The lug engaging the tread, and the main body portion of the grip plate pivoting up to also engage the tire, the grip plate is drawn under the wheel and separates it from the slippery surface.

PREFERRED EMBODIMENT OF THE INVENTION

Figure 1:
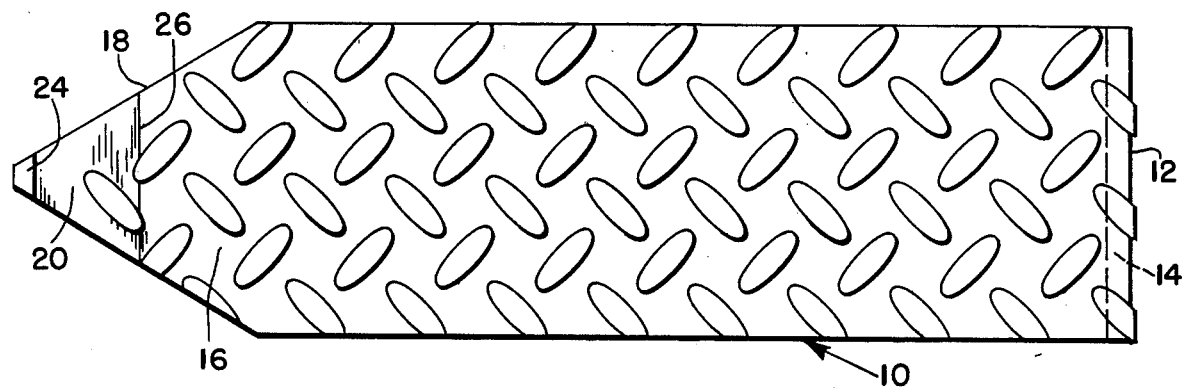
FIG. 1 is a top plan view of the new grip plate.
Figure 2:
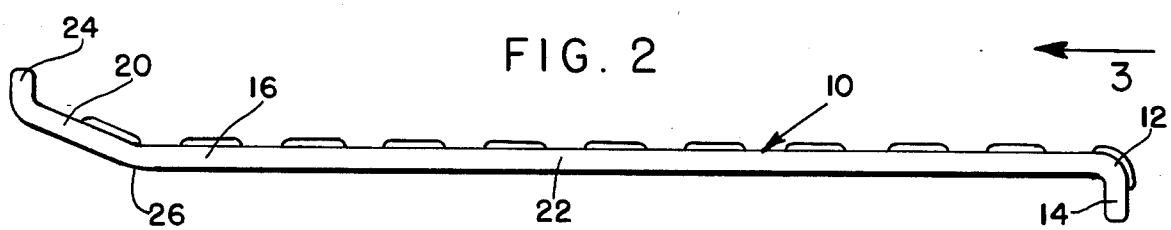
FIG. 2 is an edgeview thereof.
Figure 3:
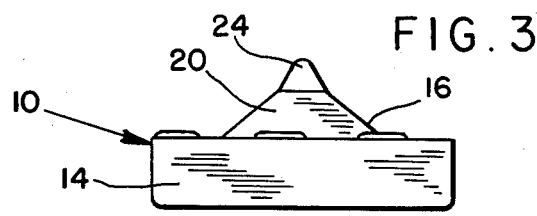
FIG. 3 is an end view looking in the direction of arrow 3 in FIG. 2.
Figure 4:
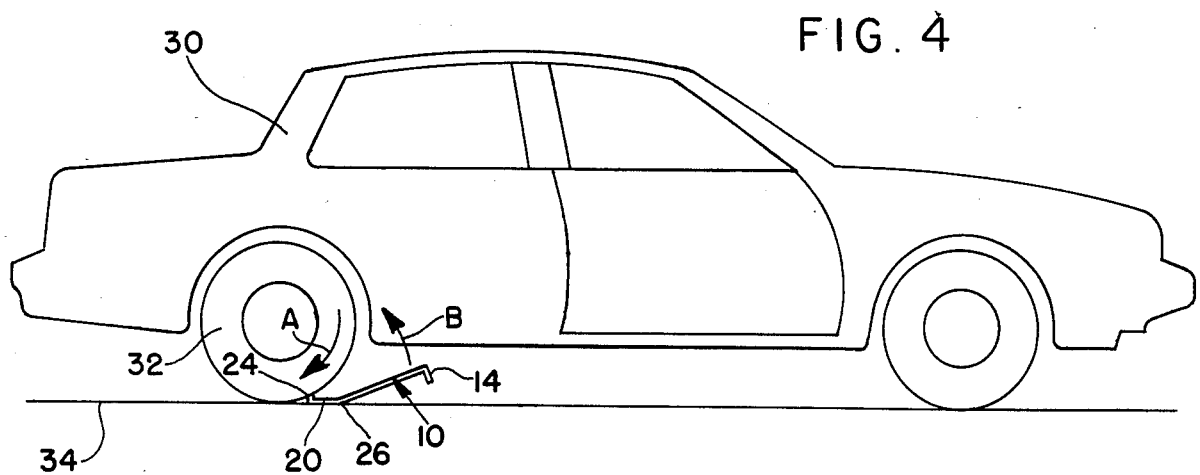
FIG. 4 is a diagrammatic view of the grip plate in position for use.

The present invention resides in a one piece solid heavy plate preferably of iron or some suitable similar material. It s preferably rectangular having a long side 10 and a short rear end 12 with a downwardly extending short lip 14, and the opposite or forward end 16 is preferably gradually reduced in width as at 18 in general triangular shape. This triangle has a forward, generally pointed portion 20 that is bent up opposite the lip 14 at a small angle e.g. 20 with relation to the general flat planar man body portion 22 of the grip plate. The bent portion 20 is preferably triangular and terminates in a turned up lug 27, also triangular, at an angle of e.g. 90° to the portion 20, and hence at an angle less than 90° to the main body 22 of the plate. This lug 24 is generally pointed, but in a dull or rounded manner. The entire plate may be provided with anti-slip protuberances if desired. The bent up portion 20 and the adjacent plate form a bend line 26.

Figure 5:
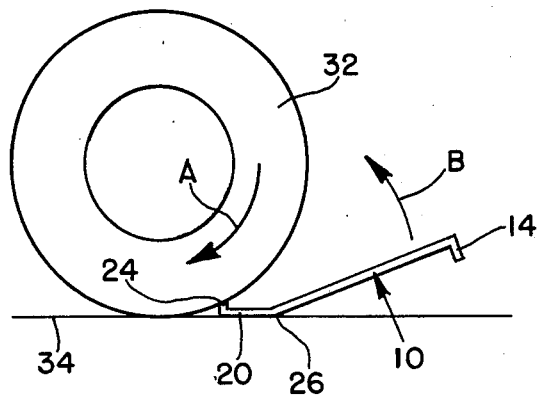
FIGS. 5 to 8 inclusive are diagrams showing the use and operation of the new grip plate.
Figure 6:
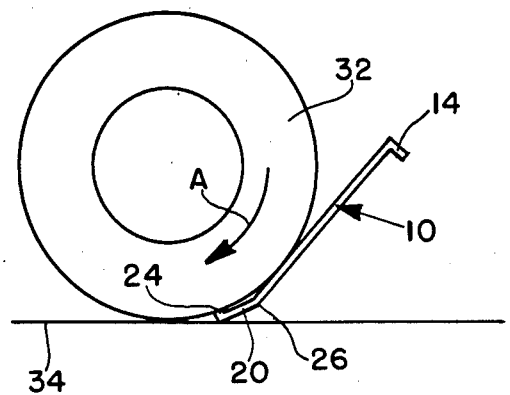
Figure 7:
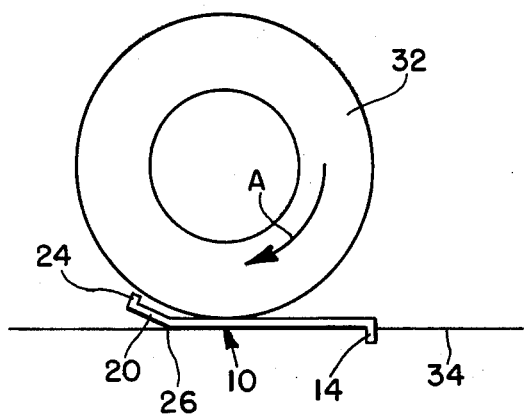
Figure 8:
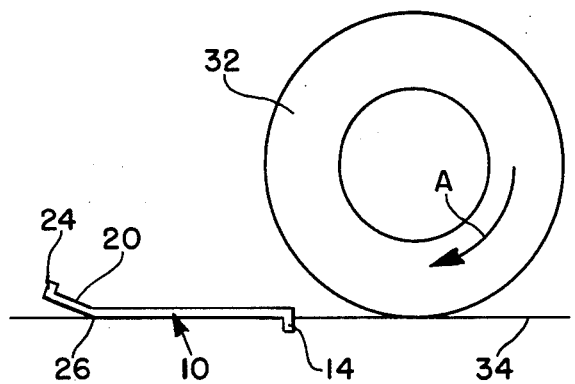

FIGS. 5 to 8 illustrate the manner of use of the new grip plate. In FIG. 5 a vehicle 30 having a drive wheel 32 is presumably stuck in place in the ice, snow, or other situation. The grip plate is placed as shown with the lug 2 in contact with the tire tread. The bend line 2 engages the surface 34 on which the wheel 32 rests, and may or may not prenetrate this surface, depending on the relative hardness thereof. The wheel is turned slowly in the direction of arrow A, and tends to drag the plate with it because of the engagement of the lug with the usual tire tread. This action causes the grip plate to tilt counterclockwise on bend line 26 which acts as a fulcrum, see FIG. 5 wherein arrow B indicates the pivot action of the grip plate under influence of the turning wheel, while FIG. 6 illustrates the action in a few cases where the surface 34 is hard ice. In any event, the grip plate is moved with the tire tread into a position under the wheel, FIG. 7. At this point, the lip 1 digs into the ice, snow, etc., and stops the grip plate from merely being shot out from under the tire and being thus made useless. Instead the grip plate being anchored, and the tire resting on it, rather than the slippery surface 34, the vehicle has to ride off the grip plate and keep on going, because of momentum, at least in part. It is seen that, therefore, the grip plate is effective due to the combination of the lug 24, the bend 26, and the lip 14. The weight of the grip plate is an additional factor, but of less consequence, but a light weight or mesh pad is very likely to be spewed out from under the tire and thus be rendered useless. Special attention is directed to the fact that by the use of the single pointed lug 24, the grip plate need not be heavily or strongly jammed under the tire, as do most of the devices of the prior art, but merely has to engage the tire tread.

I claim:

1. A grip plate for engagement with the tire of a vehicle stuck on a surface having insufficient traction, to enable the vehicle to drive off such surface,
   said grip plate comprising a flat main body including two opposite ends, a downwardly extending lip at one end, and an upwardly extending lug at the other end,
   a portion of the main body at the lug end extending upwardly at an angle thereto, the entire lug being located above the plane of the flat main body portion and there being a bend in the latter between the upwardly angled portion and the remainder of the main body,
   the lug being adapted to be placed under a portion of a tire on the vehicle with the bend on the surface and the main body of the grip plate extending upwardly at an angle from the surface,
   whereby the main body of the grip plate rotates in toward the tire as the wheel turns toward the grip plate due to engagement with the lug, the bend acting as a fulcrum, to provide friction of the tire with the grip plate, drawing the latter in under the tire and between the tire and the surface, the lip then engaging the surface and inhibiting motion of the grip plate.

2. The grip plate of claim 1 wherein the lug end of the grip plate is reduced in width.

3. The grip plate of claim 2 wherein the lug is the terminal of the reduced end of the grip plate.

4. The grip plate of claim 3 wherein the lug is located centrally of the reduced end.

5. The grip plate of claim 4 wherein the lip extends substantially across the plate.

6. The grip plate of claim one wherein the entire grip plate is a single piece of relatively heavy material.

7. A grip plate for engagement with the tire of a vehicle stuck on a surface to enable the vehicle to drive off the surface, said plate comprising a main body portion having a substantially flat surface, said main body portion being elongated with two opposite ends, one end being reduced in width, an upstanding lug terminating the reduced end, and a downwardly extending lip at the opposite end of the main body portion, a portion of the reduced end being at an upwardly extending angle to the plane of the flat surface and forming a bend in the main body portion of the grip plate, the lug being above the said plane, the lug being adapted to be placed under a portion of the tire of the vehicle with the bend of the grip plate on the first named surface and the main body portion of the grip plate extending upwardly at an angle from the surface, so that as the vehicle wheel turns in a predetermined direction, the main body portion the grip plate rotates on the bend as a fulcrum towards the tire and engages the tire for friction therewith, and the grip plate is traveled in under the tire separating it from the first named surface.

* * * * *